(12) United States Patent
December et al.

(10) Patent No.: US 8,389,653 B2
(45) Date of Patent: Mar. 5, 2013

(54) METHOD OF CATALYZING A REACTION TO FORM A URETHANE COATING AND A COMPLEX FOR USE IN THE METHOD

(75) Inventors: Timothy S. December, Rochester Hills, MI (US); Cesar G. Ortiz, Pearland, TX (US); Hardy Reuter, Münster (DE); Karl-Heinz Grosse-Brinkhaus, Nottuln (DE); Guenter Ott, Münster (DE)

(73) Assignee: BASF Corporation, Wyandotte, MI (US)

( * ) Notice: Subject to any disclaimer, the term of this patent is extended or adjusted under 35 U.S.C. 154(b) by 688 days.

(21) Appl. No.: 11/278,030

(22) Filed: Mar. 30, 2006

(65) Prior Publication Data

US 2007/0244270 A1 Oct. 18, 2007

(51) Int. Cl.
*C08F 283/00* (2006.01)

(52) U.S. Cl. ........ 525/528; 525/529; 525/530; 525/533; 525/517; 525/509

(58) Field of Classification Search ............. 525/528
See application file for complete search history.

(56) References Cited

U.S. PATENT DOCUMENTS

| | | | | |
|---|---|---|---|---|
| 4,239,860 A | * | 12/1980 | Hergenrother et al. | ....... 525/131 |
| 4,507,342 A | * | 3/1985 | Kielbania, Jr. | ............ 428/90 |
| 4,882,090 A | | 11/1989 | Batzill et al. | |
| 4,923,934 A | * | 5/1990 | Werner | ........... 525/528 |
| 4,988,420 A | | 1/1991 | Batzill et al. | |
| 5,089,645 A | * | 2/1992 | Nichols et al. | ................ 556/90 |
| 5,554,700 A | | 9/1996 | Schipfer et al. | |
| 5,630,922 A | | 5/1997 | Eswarakrishnan et al. | |
| 5,670,441 A | | 9/1997 | Foedde et al. | |
| 5,767,191 A | | 6/1998 | Zawacky et al. | |
| 5,908,912 A | | 6/1999 | Kollah et al. | |
| 5,948,229 A | | 9/1999 | Zwack et al. | |
| 5,972,189 A | | 10/1999 | McMurdie et al. | |
| 6,156,823 A | * | 12/2000 | Sikora | ........... 523/415 |
| 6,174,422 B1 | | 1/2001 | Hönig et al. | |

(Continued)

FOREIGN PATENT DOCUMENTS

| CA | 2347426 A1 | 6/2000 |
|---|---|---|
| JP | 55-086850 A | 7/1980 |
| JP | 02-158671 A | 6/1990 |
| JP | 2002-531677 A | 9/2002 |
| WO | WO 00/34398 A1 * | 6/2000 |

OTHER PUBLICATIONS

English language abstract for JP 02-158671 extracted from the PAJ database on Oct. 8, 2012, 10 pages.

(Continued)

*Primary Examiner* — Mark Eashoo
*Assistant Examiner* — Jane L Stanley
(74) *Attorney, Agent, or Firm* — Howard & Howard Attorneys PLLC

(57) ABSTRACT

A urethane coating is formed by a reaction of a hydroxy-functional resin and a blocked isocyanate crosslinker. A method of catalyzing this reaction includes forming a polymeric ligand from the resin and/or the crosslinker. The method also includes incorporating a metal catalyst with the polymeric ligand to complex the metal catalyst with the polymeric ligand. The method further includes reacting resin and the crosslinker to form the urethane coating.

21 Claims, 5 Drawing Sheets

U.S. PATENT DOCUMENTS

| | | |
|---|---|---|
| 6,190,524 B1 | 2/2001 | Kollah et al. |
| 6,265,079 B1 | 7/2001 | Nishiguchi et al. |
| 6,274,649 B1 | 8/2001 | Ott et al. |
| 6,333,367 B1 | 12/2001 | Kato et al. |
| 6,353,057 B1 * | 3/2002 | He et al. .................. 525/124 |
| 6,436,201 B1 | 8/2002 | Sugita et al. |
| 6,586,523 B1 * | 7/2003 | Blum et al. .................. 524/840 |
| 6,617,030 B2 | 9/2003 | Morishita et al. |
| 6,624,215 B1 | 9/2003 | Hiraki et al. |
| 6,710,137 B2 * | 3/2004 | Matsumoto et al. ..... 525/440.02 |
| 6,849,337 B2 * | 2/2005 | Ohrbom et al. ............... 428/413 |
| 6,951,602 B1 | 10/2005 | Reuter et al. |
| 2002/0032275 A1 * | 3/2002 | Falcone et al. ................ 524/589 |
| 2006/0247341 A1 * | 11/2006 | Hsieh et al. .................. 524/104 |

OTHER PUBLICATIONS

English language abstract for JP 55-086850 extracted from the PAJ database on Oct. 8, 2012, 11 pages.

English language abstract not available for JP 2002-531677; however, see English language equivalent CA 2347426. Original document extracted from the espacenet.com database on Oct. 8, 2012, 22 pages.

\* cited by examiner

METHOD OF CATALYZING A REACTION TO FORM A URETHANE COATING AND A COMPLEX FOR USE IN THE METHOD

FIELD OF THE INVENTION

The present invention generally relates to a method of catalyzing a reaction of a hydroxy-functional resin and a blocked isocyanate crosslinker to form a urethane coating. More specifically, the present invention uses a complex, which is the reaction product of a polymeric ligand and a metal catalyst complexed with the polymeric ligand, to catalyze the reaction. The polymeric ligand is formed from the hydroxy-functional resin and/or the blocked isocyanate crosslinker.

BACKGROUND OF THE INVENTION

It is known that blocked isocyanate crosslinkers are used as components in coating compositions, in conjunction with hydroxy-functional resins, to form urethane coatings on substrates. The urethane coating results once the coating composition is sufficiently cured. Illustrative urethane coatings include urethane powder coatings, urethane automotive base coatings, urethane automotive clear coatings, urethane electrocoatings, urethane primer coatings, urethane coil and wire coatings and the like.

It is also known that the blocked isocyanate crosslinkers require curing at elevated temperatures (e.g. greater than 320° F. and even greater than 350° F.) because, at the elevated temperatures, a blocking group associated with the crosslinker unblocks, i.e., removes itself, from the crosslinker and free isocyanate (NCO) functional groups remain. The free NCO functional groups are then capable of reaction with the hydroxy-functional groups of the resin to form a crosslinked network as the urethane coating.

Even with the elevated temperatures, the unblocking of the crosslinker is slow and, without a catalyst, typically results in urethane coatings that have a pool cure response such that the resultant coating is "underbaked" or "undercured". As such, metal catalysts have been employed and function, with the elevated temperatures, to advance the unblocking of the crosslinker and to improve the cure response of the coating. Use of such catalysts also accounts for variations in curing temperatures which often result in the underbaked condition whereby a target temperature for cure of the urethane coating is not achieved.

The metal catalysts typically include metal oxides, such as tin oxide, dibutyl tin oxide, and bismuth oxide, and organo-metallic salts, such as bismuth carboxylate and dibutyl tin dilaurate. Whether a metal oxide or an organo-metallic salt, these metal catalysts are added, in an unmodified form, directly into the composition that forms the urethane coating. Examples of such conventional metal catalysts and such conventional additions of the metal catalysts are disclosed in U.S. Pat. Nos. 5,554,700; 5,670,441; 5,908,912; 5,972,189; 6,174,422; 6,190,524; 6,265,079; 6,333,367; 6,353,057; 6,436,201; 6,617,030; and 6,624,215

There are several deficiencies associated with this direct addition of the metal catalysts. It is difficult to directly add the metal oxides into the composition. Metal oxides frequently require intensive mechanical processes, such as grinding, to be effectively incorporated into the coating composition. As for the organo-metallic salts, in many instances, portions of the organo-metallic salts solubilize in the coating composition and, as a result, lead to certain physical defects, such as craters and/or poor film coalescence (realized as an undesirable 'poor flow' cracking-like phenomenon), in the cured coating. Frequently, portions of the organo-metallic salts are simply not compatible with the coating composition. Also, these types of metal catalysts, such as the specialized metal carboxylates disclosed in U.S. Pat. No. 6,353,057, are based on fatty acid ligands formed from low molecular weight carboxylic acids. While the ligands of the '057 patent are sufficient for complexing with the metal, such as the bismuth, it is known that they can have deleterious effects on the final, i.e., cured coating.

For example, if the particular carboxylic acid used in the '057 patent is of low molecular weight, e.g. an $M_n$ less than about 200 Daltons, and is also at least partially soluble in water, then the carboxylic acid can cause contamination which is realized as craters in the cured coating. More specifically, in the art of electrocoating a substrate, it is typical for an e-coat 'bath', which contains the coating composition, to be filtered through an ultrafilter to provide an aqueous medium that is later used to rinse the substrate. When the bath is filtered through the ultrafilter, the ultrafiltrate, i.e., the portion of the bath that passes through the filter, is the aqueous medium. It is contemplated that low molecular weight carboxylic acids, such as those of the '057 patent, pass through the ultrafilter and contaminate the aqueous medium. This is undesirable because, in preparing a particular substrate, such as a body component of a vehicle, the substrate is sprayed with the aqueous medium to rinse the substrate. During spraying, the low molecular weight carboxylic acids which contaminate the aqueous medium, can also be sprayed onto the substrate thereby introducing a potentially crater-causing material on the substrate.

On the other hand, if the particular carboxylic acid used in the '057 patent is of high molecular weight, e.g. an $M_n$ more than about 500 Daltons, then it can remain in the cured coating and cause problems during formation of the cured coating, i.e., during film formation, and also cause problems associated with adhesion of the cured coating to metal. The specialized, low molecular weight, metal carboxylates of the '057 also tend to exhibit poor stability stemming from addition of the metal carboxylates, such as a bismuth carboxylate, to an aqueous acidic medium. In this situation, the potential to hydrolyze exists and this potential is undesirable.

Thus, there remains a need to improve catalysis of reactions which form urethane coatings.

SUMMARY OF THE INVENTION AND ADVANTAGES

A method of catalyzing a reaction which forms a urethane coating is disclosed. A complex for catalyzing a urethane coating composition is also disclosed. Upon cute, the urethane coating composition crosslink to forms the urethane coating. The reaction which forms the urethane coating in the present invention is, more specifically, the reaction of a hydroxy-functional resin and a blocked isocyanate crosslinker.

The method includes the step of forming a polymeric ligand from the resin and/or the crosslinker. A metal catalyst is incorporated with the polymeric ligand to complex the metal catalyst with the polymeric ligand. Thus, the complex is the reaction product of the polymeric ligand and the metal catalyst complexed with the polymeric ligand. The resin and the crosslinker are reacted to form the urethane coating.

As described above, the polymeric ligand which complexes with the metal catalyst, is derived from the resin and/or the crosslinker which are both the 'backbone' of the urethane coating. The resin and/or the crosslinker are essentially being made a 'ligand' for the metal catalyst. The polymeric ligand of this invention replaces the simple, low molecular weight carboxylic acids utilized in the prior art which are not effective.

Because the polymeric ligand is itself formed from the resin and/or the crosslinker, the polymeric ligand is integrated such that it is able to covalently link, i.e., attach or binds itself to the resin and/or the crosslinker. With this covalent linking, the polymeric ligand and therefore the metal catalyst complexed with the polymeric ligand are not extracted into the ultra-filtrate during the ultra-filtration process. As a result, maximum compatibility of the complex in the urethane coating composition is achieved and the permanence of the polymeric ligand in the urethane coating, i.e., the final cured film, is improved. With the polymeric ligand in the final urethane coating, physical properties are improved.

Also, as alluded to above, the metal catalyst is easily and more effectively incorporated into the urethane coating composition via the customized polymeric ligand as compared to the direct addition of the unmodified metal catalysts of the prior art. Furthermore, improved cure response, especially low temperature cure response, is achieved due to the improved catalytic efficiency and reactivity associated with the method and complex of the present invention. Without intending to be bound by theory, it is conjectured that, due to its association with the polymeric ligand, the metal catalyst is more proximate the reacting functional groups, i.e., the hydroxy-functional groups of the resin and the free NCO functional groups of the unblocked crosslinker, during crosslinking. The advantages associated with the present invention are especially realized in physical properties of the urethane coating, such as solvent resistance, chip resistance, and corrosion inhibition.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
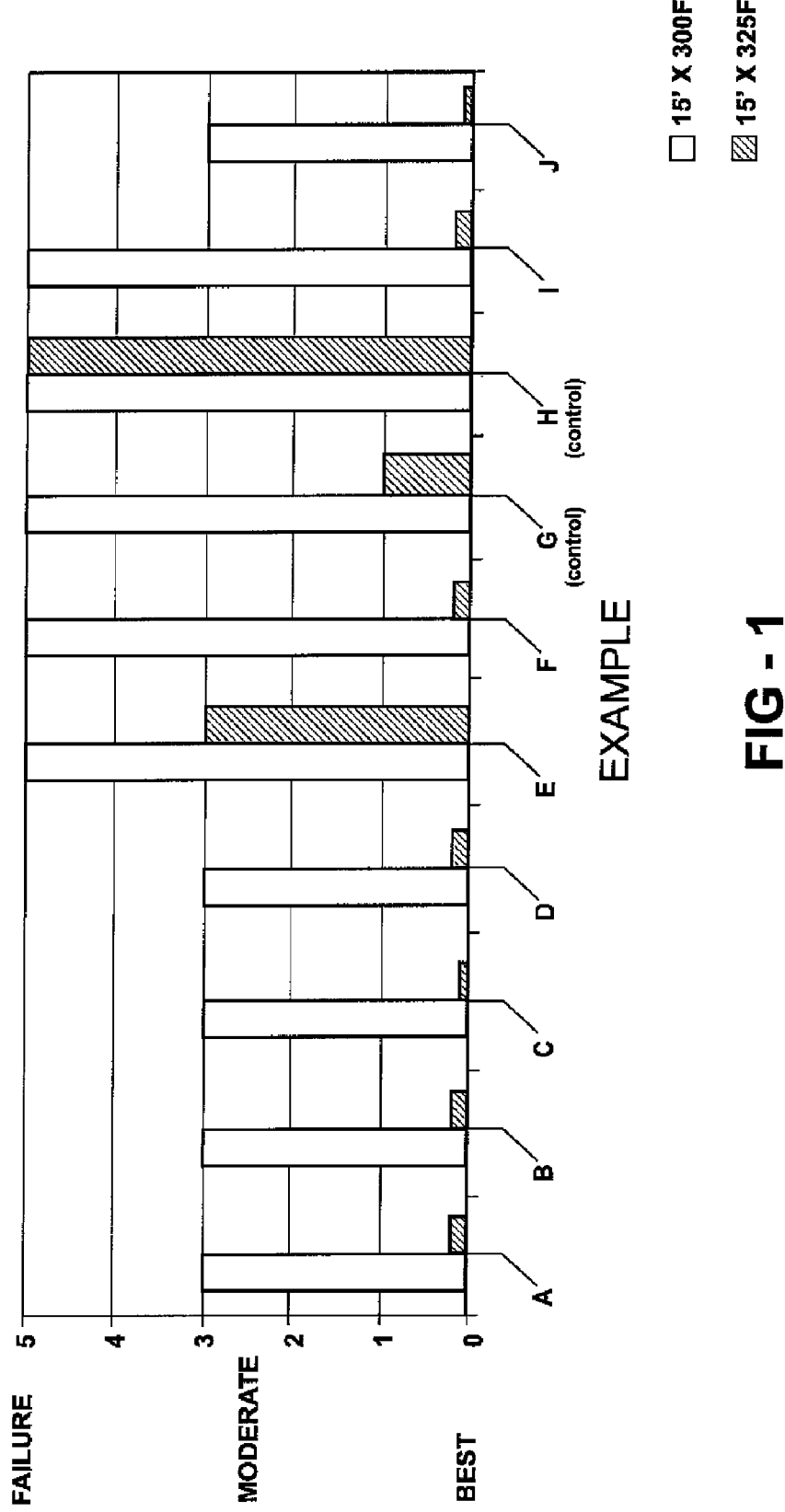
FIG. 1 is a bar graph summarizing 50 MEK Double Rub Performance of Examples A-J at two different temperatures.

A method according to the present invention catalyzes a reaction to form a urethane coating. The reaction to form the urethane coating is, more specifically, the reaction of a hydroxy-functional resin and a blocked isocyanate crosslinker, also referred to as a curing agent. The hydroxy-functional resin and the blocked isocyanate crosslinker react, or crosslink, after unblocking of the crosslinker to establish urethane linkages (—NH—CO—O—) in the urethane coating. For descriptive purposes only, the hydroxy-functional resin and the blocked isocyanate crosslinker are described below simply as the resin and the crosslinker, respectively. The method more specifically utilizes a complex to catalyze a urethane coating composition to form the urethane coating. The resin and the crosslinker are components of the urethane coating composition.

As alluded to immediately above, the urethane coating, also referred to in the art as a urethane film or a urethane layer, is formed from the urethane coating composition upon application of the urethane coating composition to a substrate and upon cure of the urethane coating composition. The urethane coating results once the urethane coating composition is sufficiently cured. Illustrative urethane coatings include urethane powder coatings, urethane automotive base coatings, urethane automotive clear coatings, urethane electrocoatings, urethane primer coatings, urethane coil and wire coatings and the like. These and other urethane coatings can be formed from urethane coating compositions that are solventborne systems or waterborne systems.

Preferred applications for the present invention are in urethane electrocoatings, or e-coats, whereby the urethane coating composition is either a cathodic electrocoat composition or an anodic electrocoat composition. With urethane electrocoatings, the urethane coating composition is electrophoretically deposited onto a substrate, such as a structural body of a motor vehicle, by immersing the substrate in a bath including the urethane coating composition. An electrical potential is applied between the substrate and a pole of opposite charge, usually a stainless steel electrode. This produces a relatively soft coating on the substrate. This relatively soft coating is converted into the urethane coating of the present invention by crosslinking the resin and the crosslinker upon exposure to elevated temperatures as known by those skilled in the art.

In addition to the hydroxy-functionality, i.e., one or more active hydrogen-containing groups, the resin preferably has one or more ionic groups or groups convertible to ionic groups. The ionic groups or groups which can be converted to ionic groups may be anionic groups or groups which can be converted into anionic groups, e.g. acidic groups such as —COOH groups, or cationic groups or groups which can be converted into cationic groups, e.g. basic groups such as amino groups and ammonium groups such as quaternary ammonium groups, or phosphonium and/or sulphonium groups. Basic groups which contain nitrogen are particularly preferred. These groups may be present in quaternised form, or are at least partially converted into ionic groups with a customary neutralizing agent such as an acid, e.g. an organic monocarboxylic acid, such as formic acid or acetic acid for example. For example, it is ideal that the resin is neutralized with an acid, such as formic acid, prior to the reaction of the resin and the crosslinker. Once neutralized, the resin is more conducive to be dispersed in water.

With the preferred applications of urethane electrocoatings, the resin is more preferably an amine-modified resin derived from an epoxy compound, most preferably a cationic resin. However, as alluded to above, anionic resins may also be used. Such epoxy resins are common throughout the urethane electrocoating industry and are typically the reaction product of (A) polyepoxides, (B) primary and/or secondary amines or salts thereof and/or salts of tertiary amines, and optionally (C) polyfunctional alcohols, polycarboxylic acids, polyamines, and/or polysulfides. Suitable amine-modified resins derived from epoxy compounds include, but are not limited to, those described in U.S. Pat. Nos. 4,882,090 and 4,988,420, the disclosures of which are herein incorporated by reference, and also those commercially available as resins from BASF Corporation of Southfield, Mich. under the trade name of CathoGuard®.

The crosslinker, as indicated above, is a blocked isocyanate crosslinker and is of the type disclosed in U.S. Pat. Nos.

4,882,090 and 4,988,420, the disclosures of which have already been incorporated by reference. The crosslinker preferably has one or more functional groups reactive with the hydroxy-functional groups of the resin. The crosslinker, more specifically, has on average greater than one isocyanate (NCO) functional group per molecule which becomes unblocked upon cure of the urethane coating composition at elevated temperatures. More specifically, with the particular resins used in the urethane coating composition, any desired crosslinker is possible where the NCO functional group or groups have been reacted with a blocking group or compound, so that the crosslinker formed is resistant to the hydroxy-functional groups of the resin at room temperature but reacts with the hydroxy-functional groups of the resin at the elevated temperatures which are generally within the range from about 200 to about 400° F.

In the preparation of the crosslinker, it is possible to use any desired organic isocyanate, typically polyisocyanate, suitable for the crosslinking. Preference is given to isocyanates which contain about 3 to 36, in particular about 8 to about 15 carbon atoms. Examples of suitable diisocyanates include, but are not limited to, trimethylene diisocyanate, tetramethylene diisocyanate, pentamethylene diisocyanate, hexamethylene diisocyanate, propylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate, 2,6-toluylene diisocyanate, 4,4-diphenylene diisocyanate (e.g. 4,4'-methylene bisdiphenyldiisocyanate), 1,5-naphthylene diisocyanate, 1,4-naphthylene diisocyanate, 1-isocyanatomethyl-5-isocyanato-1,3,3-trimethylcyclohexane, bis(4-isocyanatocyclohexyl)methane, bis(4-isocyanatophenyl)methane, 4,4'-diisocyanatodiphenyl ether and 2,3-bis(8-isocyanatooctyl)-4-octyl-5-hexylcyclohexane. It is also possible to use polyisocyanates of higher isocyanate functionality. Examples of these include tris(4-isocyanatophenyl)methane, 1,3,5-triisocyanatobenzene, 2,4,6-triisocyanatotoluene, 1,3,5-tris(6-isocyanatohexylbiuret), bis(2,5-diisocyanato-4-methylphenyl)methane, and polymeric polyisocyanates, such as dimers and trimers of diisocyanatotoluene. It is further also possible to use mixtures of polyisocyanates. The isocyanates which come into consideration for use as the crosslinker in the invention can also be prepolymers which are derived for example from a polyol, including a polyether polyol or a polyester polyol.

For the blocking group of the crosslinker, aliphatic, cycloaliphatic or aromatic alkyl alcohols are suitable. Examples of suitable aliphatic alcohols for the blocking group include, but are not limited to, as methyl, ethyl, chloroethyl, propyl, butyl, amyl, hexyl, heptyl, octyl, nonyl, 3,3,5-trimethylhexyl, decyl or lauryl alcohol. Examples of suitable cycloaliphatic alcohols for the blocking group include, but are not limited to, cyclopentanol and cyclohexanol. Examples of suitable aromatic alkyl alcohols for the blocking group include, but are not limited to, phenylcarbinol and methylphenylcarbinol. Other suitable blocking groups are hydroxylamines such as ethanolamine, oximes such as methyl ethyl ketone oxime, acetone oxime and cyclohexanone oxime or amines such as dibutylamine and diisopropylamine. Various caprolactams, such as e-caprolactam, are also suitable as blocking groups for the crosslinker. The isocyanates and blocking groups mentioned, provided these components are mixed in suitable ratios, can also be used for preparing partially blocked crosslinkers. At the elevated temperatures described above, the blocking group unblocks, i.e., leaves or chemically disassociates, from the crosslinker.

The method includes the step of forming a polymeric ligand from the resin and/or the crosslinker. That is, the polymeric ligand can be formed from the resin only, from the crosslinker only, or from both the resin and the crosslinker. The resin and/or the crosslinker function as the ligand for a metal catalyst described below. In any event, in forming the polymeric ligand, it is preferred that the resin and/or the crosslinker are carboxylated to form the polymeric ligand. When formed from the resin, the polymeric ligand preferably has a molecular weight, $M_n$, greater than approximately 1,000 Daltons, more preferably greater than approximately 2,000 Daltons. When formed from the crosslinker, the polymeric ligand preferably has a molecular weight, $M_n$, greater than approximately 800 Daltons, more preferably greater than approximately 1,000 Daltons.

Preferably, the polymeric ligand is formed from the resin. In this particular embodiment, the resin is carboxylated to form the polymeric ligand by reacting an anhydride with the resin. As such, the polymeric ligand comprises the reaction product of the resin and the anhydride as generally disclosed in the following chemical representation. The anhydride, also commonly referred to as a carboxylic acid anhydride, may be either an aromatic or non-aromatic cyclic anhydride. As is understood by those skilled in the art, the anhydride reacts with the hydroxy-functionality of the resin whereby the cyclic ring structure of the anhydride opens.

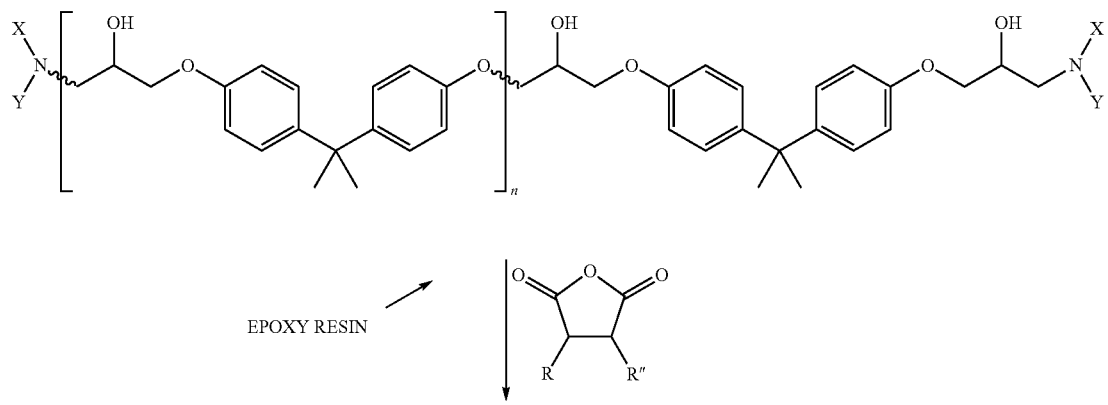

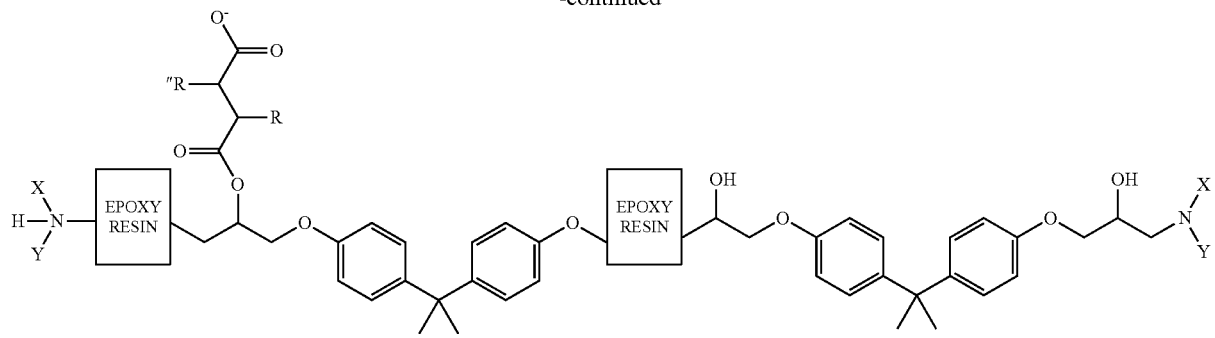

where R' and R" may each independently comprise an alkyl group, an alkenyl group, or a hydrogen atom and can be part of the same cyclic ring which may be aliphatic or aromatic (as with the example of phthalic anhydride), and where X and Y each independently comprise an alkyl group, an alkenyl group, an alkynyl group, an aromatic group, a hydrogen atom, an alkyl alcohol, or an alkyl amine. Generally, approximately 4 equivalents of anhydride are reacted to approximately 96 equivalents of the hydroxy-functionality of the resin. Also in the above general chemical representation, the resin is the cationic resin and the carboxylation of the cationic resin introduces some anionic character into the resin so the resin is, overall, better able to coordinate with the metal from the metal catalyst described below.

A more specific chemical representation illustrating the carboxylation of a preferred resin with a preferred anhydride is disclosed below.

succinic anhydride (DDSA), where the R' of the anhydride is a hydrogen atom and R" of the anhydride is an alkenyl group with 12 carbon atoms. Other suitable anhydrides include, but are not limited to, maleic anhydride, hexahydrophthalic anhydride, methyl-hexahydrophthalic anhydride, tetrahydrophthalic anhydride, phthalic anhydride, succinic anhydride, trimellitic anhydride, and mixtures thereof.

In the above specific chemical representation of the polymeric ligand, 1 mole of the anhydride is reacted for every 1 mole of the resin. As emphasized additionally below, it is to be understood that the above chemical representation is an idealized structure for the polymeric ligand and is, therefore, merely illustrative. It is to be understood that it is not necessary that all of the backbone of the polymer be modified with the anhydride. In fact, most of the polymer backbone is left unmodified by the anhydride. It is only necessary to modify enough polymer backbone to provide enough ligand to coordinate with the metal catalyst that is being introduced so that sufficient cure results can be realized. One manner to describe the extent of modification by the anhydride is that one anhy-

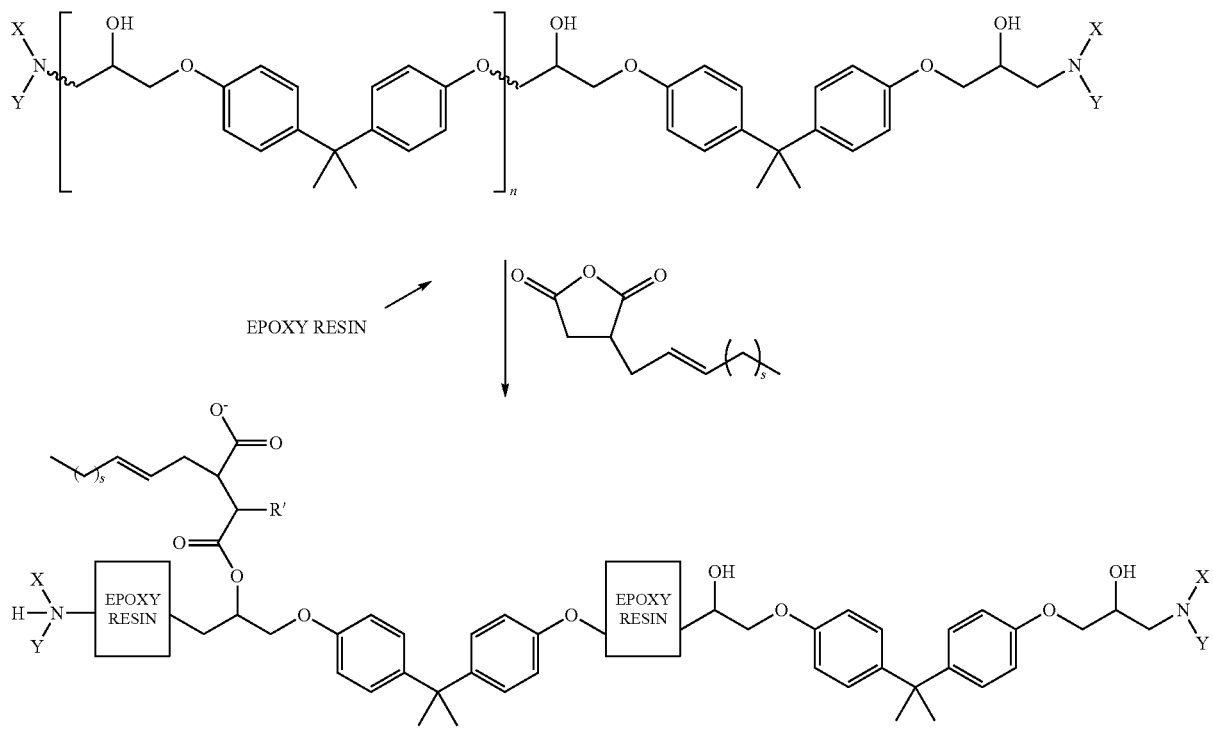

X and Y of the hydroxy-functional resin are the same as described generally above. The anhydride used immediately above in the specific chemical representation is dodecenyldride is grafted per polymer backbone to form the polymeric ligand. As understood by those skilled in the art, the terminology polymer backbone is used interchangeably with other terms in the art including polymer strand, polymer molecule and polymer segment.

In an alternative embodiment, the polymeric ligand is formed from the crosslinker rather than from the resin. Typically, the crosslinker is carboxylated to form the polymeric ligand by reacting a hydroxy-functional carboxylic acid with the crosslinker. The hydroxy-functional carboxylic acid must be hydroxy-functional to the extent that it has at least one hydroxy group. Preferably, the hydroxy-functional carboxylic acid has two hydroxy groups. As such, the hydroxy-functional carboxylic acid can be a monol carboxylic acid, having one hydroxy group and the carboxylic acid group, or a diol carboxylic acid, having two hydroxy groups and the carboxylic acid group.

A suitable general formula for the hydroxy-functional carboxylic acid with one hydroxy group and the carboxylic acid group is disclosed below.

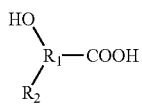

where $R_1$ and $R_2$ each independently comprise an alkyl group, an alkenyl group, an alkynyl group, an aromatic group, an alkyl ether group, or a hydrogen atom Examples of such hydroxy-functional carboxylic acids include, but are not limited to, lactic acid and 12-hydroxystearic acid.

A suitable general formula for the hydroxy-functional carboxylic acid with two hydroxy groups and the carboxylic acid group is disclosed below

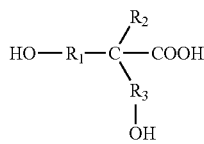

where $R_1$, $R_2$, and $R_3$ are each independently organic chains having from 1 to 8 carbon atoms. Examples of such a hydroxy-functional carboxylic acid include, but are not limited to, 2,2'-bis(hydroxymethyl)propionic acid, also referred to as dimethylolpropionic acid (DMPA), 2,2-bis(hydroxymethyl) butylic acid, and dimethylbis(hydroxymethyl) malonate.

The carboxylation of the crosslinker with the monol carboxylic acid is generally disclosed in the following chemical representation where the exemplary crosslinker is 4,4'-methylene bisdiphenyldiisocyanate (MDI) which is a pure MDI isomer that is commercially available from BASF Corporation under the tradename Lupranate® M. It is to be understood that this pure MDI isomer is used herein primarily for illustrative purposes. To this end, it is to be understood that polymeric grade crosslinkers, such as polymeric MDI, are more commonly used in the relevant industries. One example of a suitable polymeric MDI is commercially available from BASF Corporation under the tradename the Lupranate® M20S.

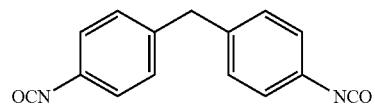

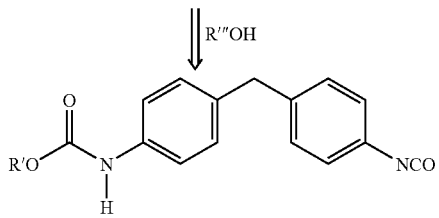

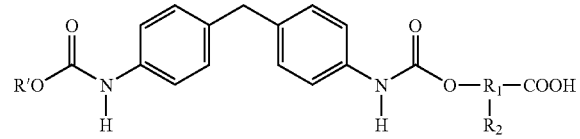

In the above chemical representation, R''' is an aliphatic group, such as an alkyl group, an alkenyl group, an alkynyl group, an alkyl ether group, and the like, a cycloaliphatic group, or an aromatic alkyl group. $R_1$ and $R_2$ each independently comprise an alkyl group, an alkenyl group, an alkynyl group, an aromatic group, an alkyl ether group, or a hydrogen atom. Furthermore, the first reaction illustrates blocking of the crosslinker with an alcohol as the blocking group, and the second reaction illustrates the carboxylation of the crosslinker with the monol carboxylic acid. One typical blocking group alcohol is diethyleneglycolbutylether alcohol (Bu—O—CH2CH2-O—CH2CH2-OH), where R''' is Bu—O—CH2CH2-O—CH2CH2-O— The polymeric ligand comprises the reaction product of the crosslinker and the hydroxy-functional carboxylic acid, in this case the monol carboxylic acid. In this particular chemical representation, one mole of the hydroxy-functional carboxylic acid is reacted for every one mole of the crosslinker.

The carboxylation of the crosslinker with the diol carboxylic acid is generally disclosed in the following chemical representation where the exemplary hydroxy-functional carboxylic acid is DMPA and the exemplary crosslinker is 4,4'-methylene bisdiphenyldiisocyanate (MDI) as described above. It is to be understood that this chemical representation, as well as the other general chemical representations included herein, are merely intended to generally illustrate the salient features of the components and the reaction. They are not intended to be exact representations

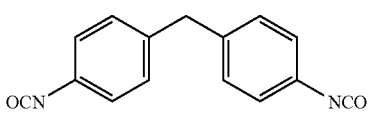

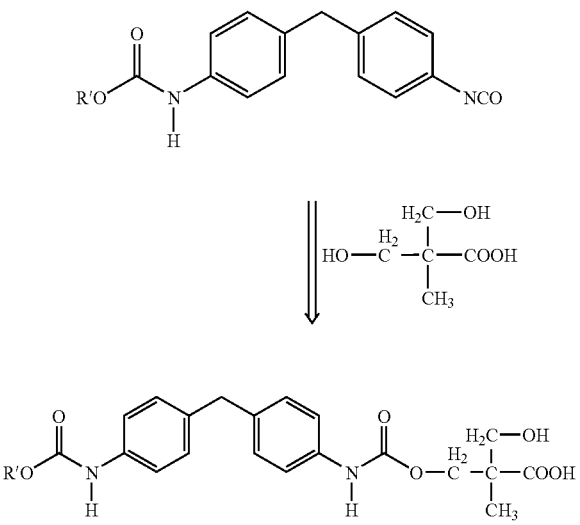

In the above chemical representation, R'" is as defined above. The first reaction illustrates blocking of the crosslinker with an alcohol as the blocking group, and the second reaction illustrates the carboxylation of the crosslinker with the diol carboxylic acid, specifically with DMPA. The polymeric ligand comprises the reaction product of the crosslinker and the hydroxy-functional carboxylic acid, in this case the diol carboxylic acid in this particular chemical representation, one mole of the hydroxy-functional carboxylic acid is reacted for every one mole of the crosslinker. The remaining hydroxyl group in the polymeric ligand can also be reacted with isocyanate to chain extend the structure. This will result in a carboxyl group in the middle of the polymer chain.

The method of the present invention also includes the steps of incorporating the metal catalyst with the polymeric ligand to complex the metal catalyst with the polymeric ligand and reacting the resin and the crosslinker to form the urethane coating. The complex includes the reaction product of the polymeric ligand, as represented above, and the metal catalyst which is complexed with the polymeric ligand. In this context, the reaction product is a metal carboxylate.

It is ideal that the metal catalyst is incorporated with the polymeric ligand prior to the reacting of the resin and the crosslinker to form the urethane coating. However, it is also to be recognized that, in theory, the metal catalyst could be incorporated with the polymeric ligand as the resin and the crosslinker are reacting to form the urethane coating rather than before the reaction.

Preferably, the metal catalyst is of the general formula of MO or $M(OH)_n$ or $R^4_x MO$, where M is a metal selected from the group of Bi, Sn, Sb, Zn, Y, Al, Pb, Zr, Ce, Cu, and mixtures thereof, O represents an oxygen atom, OH represents a hydroxide ion, n is an integer satisfying the valency of M, $R^4$ is an organic group, preferably alkyl, having from 4 to 15 carbon atoms, and x is an integer from 1 to 6. Thus, in this preferred scenario, the step of incorporating the metal catalyst with the polymeric ligand comprises incorporating a metal catalyst of the general formula MO or $M(OH)_n$ or $R^4_x MO$. Dibutyl tin oxide and a metal oxide, such as zinc oxide or bismuth oxide, are, combined or independently, the preferred metal catalysts for use in the present invention. It is also to be understood that the various metal catalysts of the formulae MO or $M(OH)_n$ or $R^4_x MO$ can be used alone or in combinations with one another. In other words, one metal catalyst or even a combination of metal catalysts can be employed. Other potential metal catalysts include, but are not limited to, other various oxides of zinc or bismuth, SnO, $SnO_2$, $Y_2O_3$, and CuO. Preferably, the metal catalyst, including the exemplary oxides listed above, is supplied in a milled form having a low particle size (e.g. less than 20 microns, more typically less than 10 microns) such that no additional grinding is needed to reduce the particle size of the metal catalyst for effective incorporation of the metal catalyst with the polymeric ligand.

In the context of the preferred embodiment where the polymeric ligand is formed by carboxylating the resin, the metal catalyst is incorporated with the carboxylated resin to complex the metal catalyst with the carboxylated resin as generally disclosed in the following chemical representation

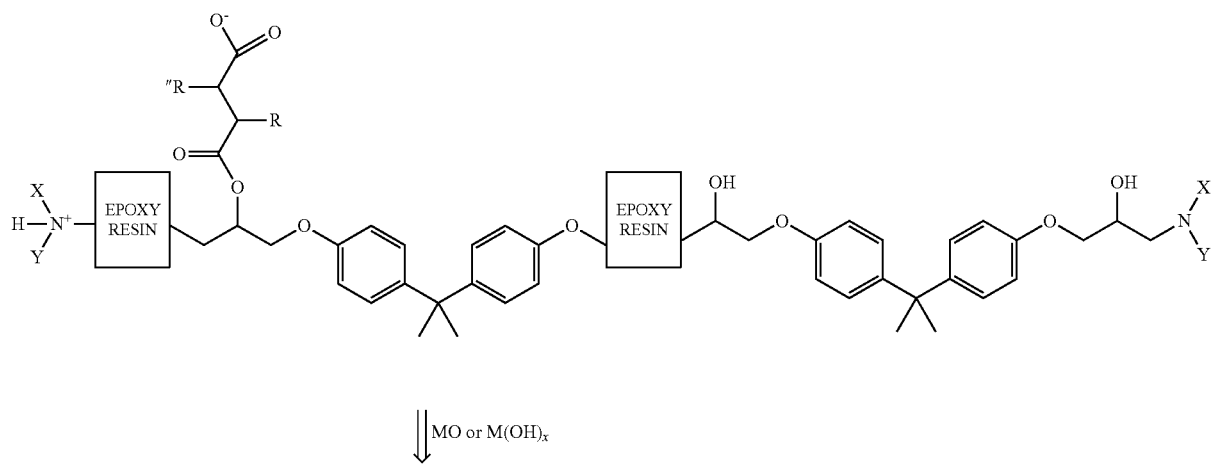

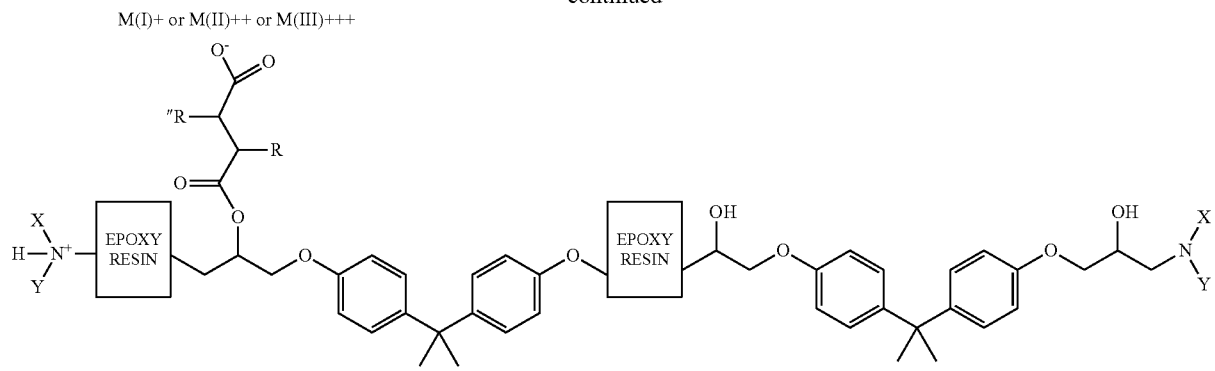

where N, Y, R', R" are as defined above. In the above chemical representation, the complex can generally be represented by the formula M(L)n, where M is the metal, L is the polymeric ligand, and n is an integer satisfying the valency of M. Therefore, if M has a valency of +2, then n=2 and there are two equivalents of polymeric ligands, if M has a valency of +3, then n=3 and there are three equivalents of polymeric ligands, and so on. Also in the above chemical representation, the metal M(I)+ or M(II)++ or M(III)+++ from the metal catalyst, MO or M(OH)$_n$ or R$^4_x$MO is coordinated to the polymeric ligand to establish the complex. It is to be appreciated that, although not represented, the metal catalyst can be complexed with the crosslinker rather than the resin as disclosed immediately above.

The metal catalyst can be incorporated with the polymeric ligand at various times. In one embodiment, the metal catalyst is actually incorporated with the polymeric ligand simultaneous with the step of forming the polymeric ligand from the resin and/or the crosslinker, i.e., as the polymeric ligand itself is being formed. Alternatively, the metal catalyst can be incorporated with the polymeric ligand after the polymeric ligand is formed and prior to the reaction of the resin and the crosslinker to form the urethane coating. For instance, a pigment-containing composition may be incorporated prior to the step of reacting the resin and the crosslinker. As is known in the art, such pigment-containing compositions are common with the electrocoat compositions described above. These pigment-containing compositions may also be referred to as pigment pastes. The metal catalyst can be incorporated into the pigment-containing composition to complex the metal catalyst with the polymeric ligand. In any event, the metal catalyst, such as a simple metal oxide, is complexed with the polymeric ligand prior to reaction of the resin and the crosslinker to form the urethane coating.

It is to be understood that all of the preceding chemical representations are merely two-dimensional chemical representations and that the structure of these chemical representations may be other than as indicated.

The following examples illustrating specifics associated with the urethane coating composition and the complex and their use in forming the urethane coating according to the subject invention, as presented herein, are intended to illustrate and not limit the invention.

EXAMPLES

Twenty examples, specifically Examples A-T, are prepared as described below and as indicated in Tables 1A, 1B, 2A, and 2B. Examples A-J utilize Emulsion 1 and Examples K-T utilize Emulsion 2. Examples A-F, I, J-P, S, and T are examples according to the invention. Examples G and Q are one form of a control example where, although DDSA is included in the urethane coating composition, no metal catalyst is included Example H and R are another form of a control example where, although a metal catalyst is included in the urethane coating composition, no anhydride is included to carboxylate the resin. The examples are all urethane coating compositions, specifically urethane cationic electrodeposition coatings.

In these Examples, the hydroxy-functional resin is carboxylated with the anhydride, specifically with dodecenyl-succinic anhydride (DDSA). A suitable hydroxy-functional resin for these Examples is a cathodic electrodepositing resin. The DDSA is obtained from Dixie Chemical of Pasadena, Tex. As described in greater detail below, this reaction product is in the form of an emulsion, Emulsions 1 and 2 below. Additionally, a pigment-containing composition, also known to those skilled in the art as a pigment paste, is used. For all Examples except for Examples J and T, the metal catalyst is incorporated into the pigment paste and then the pigment paste containing the metal catalyst is incorporated into the emulsion to establish an electrocoat bath where the metal catalyst complexes with the hydroxy-functional resin.

Emulsion Type 1 is more specifically made as follows.

In a 3 L flask with an associated heating mantle;
  diglycidyl ether of bisphenol A, DGEBA, (17.94 g, 0.095 eq. epoxy),
  bisphenol A, BPA, (4.08 g, 0.036 eq OH),
  a phenol or substituted phenol (0.015 eq, OH) (such as dodecylphenol, p-cresol, phenol, or combinations thereof), and
  xylene (0.357 g)
  are combined While stirring, the temperature is raised to 125° C. Subsequently, triphenyl phosphine (0.032 g) in xylene (0.0.7 g) is added and the exotherm is recorded (189° C.). The mixture is then allowed to cool to 132° C., and a WPE determination (target=525+/−25) is conducted and is 529. After cooling to 82° C. and turning off the heating mantle, 0.016 eq N of an amine, such as diethanol amine, methylethylanolamine, or combinations thereof, is introduced and the exotherm is recorded (107° C.) The mixture is allowed to stir for an additional 30 minutes after reaching exotherm. After stirring for 30 minutes, 3-dimethylamino propyl amine is added at 105° C., and the exotherm is recorded (144° C.) The mixture is stirred for an additional hour. A toluene (0.344 g) solution of DDSA (1.13 g, 0.004 eq.) is subsequently introduced at 105° C., and the mixture is allowed to stir for approximately 1.5 hr. An additional 50 g of toluene is added. Pluracol P710R polyol (2.5413 g) is then added followed by the crosslinker (13.53 g, 0.051 eq.) and Dowanol PnB (0.344 g). The crosslinker is a blocked isocyanate based on polymeric MDI and monofunctional alcohols, such as diethylene glycol butyl ether. After achieving a homogeneous mixture, the carboxylated resin is added to an acid mixture, under constant stirring, including deionized water (31.095 g), formic acid (85%) (0.588 g), and nitric acid (0.050 g). After thoroughly mixing all components by using a metal spatula with mixing, the theoretical solids are further reduced by addition a water (20.0 g). Additives (0.4 g) independent, or in an additive package, are added to the acid mixture and to the 20.0 g of water. All raw materials, including the various solvents used above, are industrial grade and no further purifications are made.

Emulsion Type 2 is more specifically made as follows.

In a reactor equipped with a stirrer, reflux condenser, internal thermometer and inert gas inlet, 6150 parts of epoxy resin based on bisphenol A having an epoxy equivalent weight (EEW) of 188 are heated to 125° C. under a nitrogen atmosphere together with 1400 parts of bisphenol A, 335 parts of dodecylphenol, 470 parts of p-cresol and 441 parts of xylene and the mixture is stirred for 10 minutes. It is subsequently heated to 130° C. and 23 parts of N,N-dimethylbenzylamine are added. The reaction mixture is held at this temperature until the EEW has reached the level of 880 g/eq. A toluene (118 g) solution of DDSA (389 g, 1.377 eq) is subsequently introduced at 105° C. to form a carboxylated resin, and the mixture is allowed to stir for approximately 1.5 hr. A mixture of 7097 parts of the crosslinker and 90 parts of a flow additive is then added and the resulting mixture is held at 100° C. The crosslinker is a blocked isocyanate based on polymeric MDI and monofunctional alcohols, such as diethylene glycol butyl ether and/or butyl diglycol. Approximately 30 minutes later, 211 parts of butyl glycol and 1210 parts of isobutanol are added.

Immediately following this addition, a mixture of 467 parts of a precursor (diethylenetriamine diketimine in methyl isobutyl ketone) and 520 parts of methylethanolamine are introduced into the reactor and the batch is brought to a temperature of 100° C. After a further half an hour, the temperature is raised to 105° C. and 159 parts of N,N-dimethylaminopropylamine are added.

75 minutes after the amine addition, 903 parts of Plastilit® 3060 (propylene glycol compound, BASF/Germany) are added and the mixture is diluted with 522 parts of propylene glycol phenyl ether (mixture of 1-phenoxy-2-propanol and 2-phenoxy-1-propanol, BASF/Germany), in the course of which it is cooled rapidly to 95° C.

After 10 minutes, 14821 parts of the reaction mixture are transferred to a dispersing vessel 474 parts of lactic acid (89% in water), dissolved in 7061 parts of deionized water, are added in portions with stirring. The mixture is subsequently homogenized for 20 minutes before being diluted further with an additional 12600 parts of deionized water in small portions. The volatile solvents are removed by vacuum distillation and then replaced by an equal volume of deionized water.

The metal catalysts included in the tables below are added into a pigment paste. The raw material for the metal catalysts, metal salts, are generally available in the form of ZnO, $Bi_2O_3$, $Bu_2SnO$, $SnO_2$, $ZrO_2$, $Y_2O_3$, and CuO from Aldrich Chemical Co. As is known to those skilled in the art, pigment pastes for urethane-based electrocoatings also include the pigment(s), fillers and additives. The pigment paste containing the metal catalyst is incorporated into the emulsion to establish an electrocoat bath where the metal catalyst complexes with the polymeric ligand, in these Examples the carboxylated hydroxy-functional resin, to catalyze the urethane forming reaction upon cure.

Examples A-J

TABLE 1A

| Urethane Coating Composition Example (Electrocoat Bath)[1] | Emulsion Type | Relative Level of Anhydride (DDSA) | Amount of DDSA Wt. (%)[2] | mmol (%)[3] | Pigment Taste[4] DBTO |
|---|---|---|---|---|---|
| A | 1 | HIGH | 3 | 10 | DBTO |
| B | 1 | HIGH | 3 | 10 | DBTO |
| C | 1 | HIGH | 3 | 10 | DBTO |
| D | 1 | HIGH | 3 | 10 | DBTO |
| E | 1 | HIGH | 3 | 10 | DBTO |
| F | 1 | HIGH | 3 | 10 | DBTO |
| G | 1 | HIGH | 3 | 10 | DBTO |
| H | 1 | — | — | — | DBTO |
| I | 1 | LOW | 1.5 | 5 | DBTO |
| J[8] | 1 | HIGH | 3 | 10 | DBTO |

TABLE 1B

| Urethane Coating Composition Example (Electrocoat Bath) | Metal Of Metal Catalyst in Pigment Paste[5] | Oxidation Of Metal | Amount Wt. (%)[6] | mmol (%)[7] |
|---|---|---|---|---|
| A | Tin | IV | 0.5 | 4 |
| B | Bismuth | III | 0.5 | 2 |
| C | Zirconium | IV | 0.5 | 5 |
| D | Zinc | II | 0.5 | 8 |
| E | Copper | I | 0.5 | 8 |
| F | Yttrium | IV | 0.5 | 6 |
| G | — | — | — | — |
| H | Zinc | II | 0.5 | 8 |
| I | Zinc | II | 0.5 | 8 |
| J[8] | Zinc | II | 0.5 | 8 |

Examples K-T

TABLE 2A

| Urethane Coating Composition Example (Electrocoat Bath)[1] | Emulsion Type | Relative Level of Anhydride (DDSA) | Amount of DDSA Wt. (%)[2] | mmol (%)[3] | Pigment Paste[4] DBTO |
|---|---|---|---|---|---|
| K | 2 | HIGH | 3 | 10 | DBTO |
| L | 2 | HIGH | 3 | 10 | DBTO |
| M | 2 | HIGH | 3 | 10 | DBTO |
| N | 2 | HIGH | 3 | 10 | DBTO |
| O | 2 | HIGH | 3 | 10 | DBTO |
| P | 2 | HIGH | 3 | 10 | DBTO |
| Q | 2 | HIGH | 3 | 10 | DBTO |
| R | 2 | — | — | — | DBTO |
| S | 2 | LOW | 1.5 | 5 | DBTO |
| T[8] | 2 | HIGH | 3 | 10 | DBTO |

TABLE 2B

| Urethane Coating Composition Example (Electrocoat Bath) | Metal Of Metal Catalyst in Pigment Paste[5] | Oxidation Of Metal | Amount Wt. (%)[6] | Amount mmol (%)[7] |
|---|---|---|---|---|
| K | Tin | IV | 0.5 | 4 |
| L | Bismuth | III | 0.5 | 2 |
| M | Zirconium | IV | 0.5 | 5 |
| N | Zinc | II | 0.5 | 8 |
| O | Copper | I | 0.5 | 8 |
| P | Yttrium | IV | 0.5 | 6 |
| Q | — | — | — | — |
| R | Zinc | II | 0.5 | 8 |
| S | Zinc | II | 0.5 | 8 |
| T[8] | Zinc | II | 0.5 | 8 |

The superscripts included in Tables 1A-2B are defined as follows:

[1]=Approximately 6500 g with 19% non-volatile and a P/B=0.16;

[2]=(grams of DDSA)/(grams of emulsion solids)×100%; added during preparation of the resin into the emulsion (except for Example J);

[3]=(mmol of DDSA)/(grams of emulsion solids)×100%;

[4]=pigment paste contains approximately 0.50% DBTO (dibutyl tin oxide) relative to emulsion solids;

[5]=added into the pigment paste in the oxide form;

[6]=(grams of metal)/(grams of emulsion solids)×100%; and

[7]=(mmol of metal)/(grams of emulsion solids)×100%

[8]=metal catalyst added directly to the emulsion (after carboxylation with DDSA and after the crosslinker) instead of to the pigment paste.

With the urethane coating compositions of the Examples formed, panels are prepared for certain tests (described in detail below) involving only Examples A-J. The tests are the MEEK Double Rub Solvent Resistance Test, the Chip Resistance test, and Corrosion Tests G and L. Two types of panel substrates are employed depending on the particular test: cold rolled steel (CRS) with zinc phosphate treatment and zinc-iron treated (Zn/Fe) panels. All panels are 4"×6" in dimension and are purchased from ACT. The panels are electrocoated by techniques known to those skilled in the art to film builds of 0.40 mil and 0.80 mil, again depending on the particular test.

MEK Double Rub Solvent Resistance Test:

As an initial screening tool to assess cure, methyl ethyl ketone (MEK) double rubs are carried out. The panels are CRS with zinc phosphate treatment and the urethane coatings compositions are coated and cured at various times and temperatures to form urethane coatings of approximately 0.80 mil.

Using a piece of cheese cloth soaked with MEK and wrapped around the index finger, a total of 20, 50, and 100 double rubs are carried out using slight pressure. After the double rubs, the panels are rated: 0 (no change), 1 (slight change), 3 (moderate change), and 5 (severe change-metal exposure, failure).

Complete data for the MEK double rub solvent resistance test of Examples A-J is found below in Table 3. For illustrative purposes, a graph summarizing the 50 MEK Double Rub Performance of Examples A-J at two different temperatures is included as FIG. 1.

TABLE 3

| | BATH | | | | | | | | | |
|---|---|---|---|---|---|---|---|---|---|---|
| | A | B | C | D | E | F | G | H | I | J |
| 15' × 290 F. | | | | | | | | | | |
| 20 Rubs | 5 | 5 | 5 | 5 | 5 | 5 | 5 | 5 | 5 | 5 |
| 50 Rubs | 5 | 5 | 5 | 5 | 5 | 5 | 5 | 5 | 5 | 5 |
| 100 Rubs | 5 | 5 | 5 | 5 | 5 | 5 | 5 | 5 | 5 | 5 |
| 20' × 290 F. | | | | | | | | | | |
| 20 Rubs | 3 | 5 | — | 3 | 5 | 5 | — | 5 | 5 | 3 |
| 50 Rubs | 5 | 5 | — | 5 | 5 | 5 | — | 5 | 5 | 5 |
| 100 Rubs | 5 | 5 | — | 5 | 5 | 5 | — | 5 | 5 | 5 |
| 15' × 300 F. | | | | | | | | | | |
| 20 Rubs | 3 | 3 | 3 | 3 | 5 | 5 | 3 | 5 | 5 | 3 |
| 50 Rubs | 3 | 3 | 3 | 3 | 5 | 5 | 5 | 5 | 5 | 3 |
| 100 Rubs | 3 | 3 | 3 | 3 | 5 | 5 | 5 | 5 | 5 | 5 |
| 15' × 325 F. | | | | | | | | | | |
| 20 Rubs | 0 | 0 | 0 | 0 | 3 | 0 | 0 | 5 | 0 | 0 |
| 50 Rubs | 0 | 0 | 0 | 0 | 3 | 0 | 1 | 5 | 0 | 0 |
| 100 Rubs | 1 | 1 | 1 | 0 | 3 | 0 | 1 | 5 | 1 | 1 |
| 20' × 350 F. | | | | | | | | | | |
| 20 Rubs | 0 | 0 | 0 | 0 | 0 | 0 | 0 | 1 | 0 | 0 |
| 50 Rubs | 0 | 0 | 0 | 0 | 1 | 0 | 0 | 3 | 0 | 0 |
| 100 Rubs | 0 | 0 | 0 | 0 | 3 | 0 | 0 | 3 | 0 | 0 |

All panels baked at 290° F. exhibit complete failure, except for those containing Zn and Sn at 20 Rubs after baking for 20 minutes. Better solvent resistance is noted after baking at 300° F. Baths containing Sn, Bi, Zr, and Zn are found to exhibit moderate solvent resistance (i.e., rating of 3) at this bake, while those containing Cu and Y show complete failure. Not adding any catalyst or DDSA yields poor results as well. Raising the bake temperature to 325 and 350° F. results in an increase of solvent resistance as all panels show no change except for those coated with baths containing Cu and those not incorporating any catalyst or DDSA Chip Resistance Test:

The CRS with zinc phosphate treatment panels and the Zn/Fe panels are coated with the urethane coating compositions of Examples A-J to form urethane coatings of approximately 0.8 mil. These panels are cured at approximately 325° F. for approximately 15 minutes.

To these electrocoated panels, a primer, base coat, and clear coat are first applied. The primer is a gray primer based on acrylic/polyester-melamine chemistry. The base coat is a white basecoat based on acrylic-melamine chemistry. The clear coat is a high solids solventborne clearcoat also based on acrylic-melamine chemistry. The corresponding film build for the primer, base coat, and clear coat are 0.9-1.0, 1.0-1.1, and 1.7-2.0 mil, respectively. With the primer, a 5-minute flash in the booth is employed, followed by baking for 20 minutes at 325° F. After applying the primer, a 10-minute flash in the booth is used for the base coat without any additional bake, and the clear coat is subsequently sprayed, followed by flashing for 10 minutes and baking for 20 minutes at 280° F.

Using the Multi-Test Gravelometer, produced by Q-Panel Lab Products, chip resistance is carried out by first placing each panel in a freezer (appx. −20° C.) for at least 4 hours and then exposing the panels, individually, to two pints of gravel at 70 psi with a 90 degree impact. After cleaning each panel of dust, a standard tape pull is performed using Scotch Filament Tape 898 of a 2 inch width, and the VIEW Digital Image Analyzer 5.0, produced by ATLAS Analytical Instruments, is employed to determine paint loss as a percentage. The results are indicated in FIGS. 2 and 3

Figure 2:
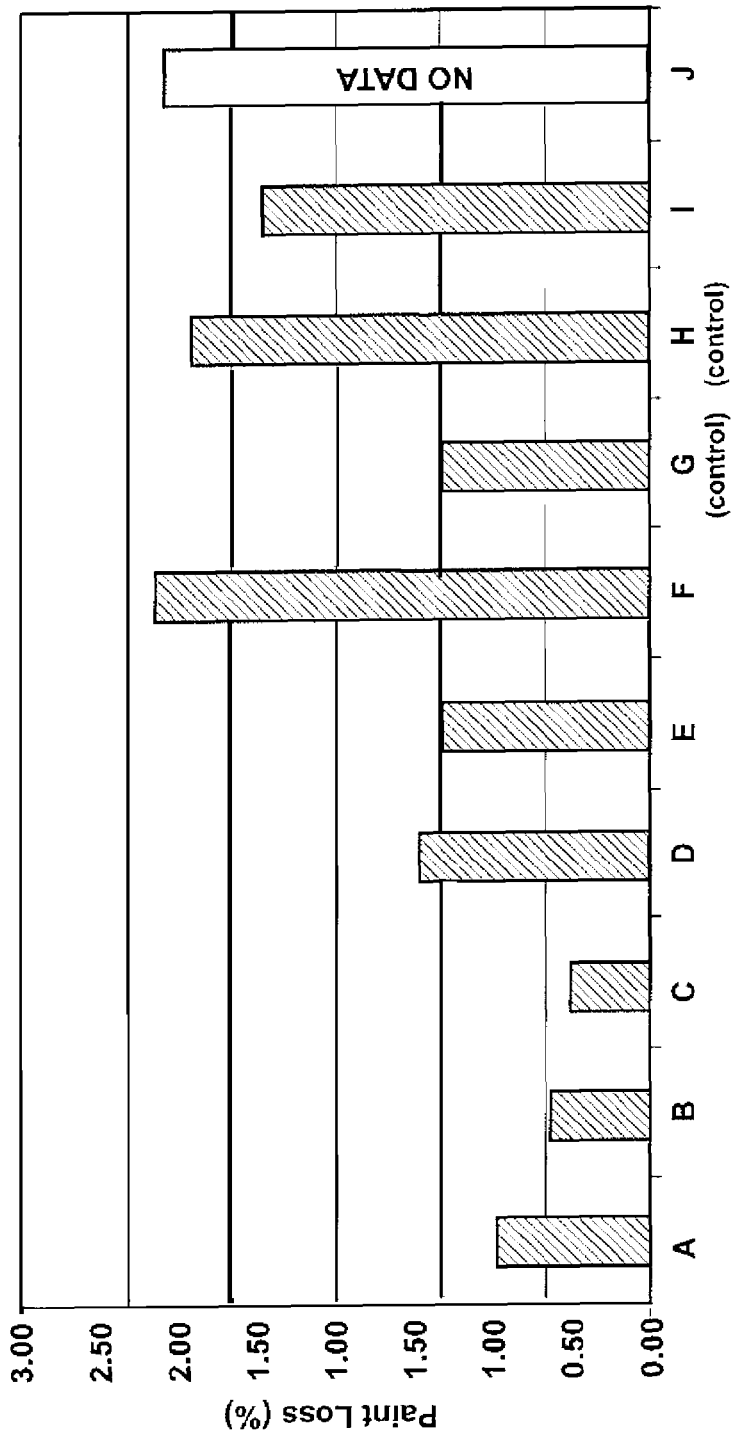
FIG. 2 is a bar graph summarizing % Paint Loss of Examples A-J on CRS panels (with zinc phosphate treatment)
Figure 3:
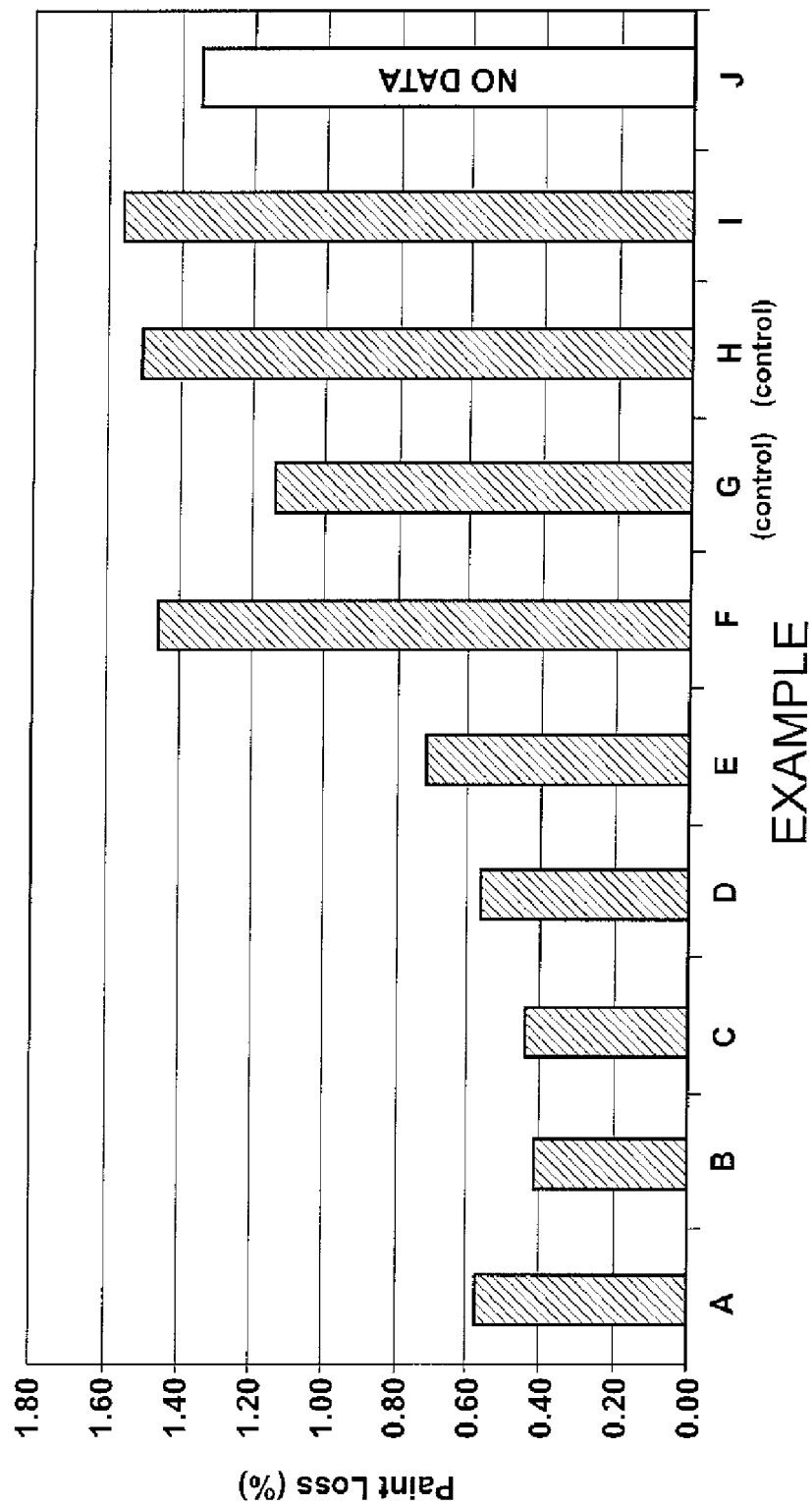
FIG. 3 is a bar graph summarizing % Paint Loss of Examples A-J on Zn/Fe panels.

Referring to FIG. 2, the best performance on CRS is observed using Sn, Bi, and Zr as the catalyst. Adequate performance results are noted with Zn, Cu, and without the use of a catalyst and high DDSA content Y shows relatively poor performance in chip resistance. Referring to FIG. 3, similar trends are realized with Zn/Fe panels as Sn, Bi, and Zr show better chip resistance than Y and not using any DDSA yields poor performance. Overall, referring to both FIGS. 2 and 3, the addition of DDSA shows improved performance.

Corrosion Test G (Single Scab):

The CRS with zinc phosphate treatment panels are coated with the urethane coating compositions of Examples A-J to form urethane coatings of approximately 0.8 mil. These panels are cured at approximately 325° F. for approximately 15 minutes. These panels are strategically baked at 325° F., as opposed to 350° F., to better differentiate performance.

After coating, each panel is scribed directly down the middle with the shape of vertical line, "|". The exposure cycle is as follows. On Monday, each panel is held at 60° C. for one hour in an air-circulating oven and is then subjected to a cold cabinet at −25° C. and held for 30 minutes. Following, the panels are immersed for 15 minutes in a 5% (wt.) NaCl solution (saline). After removal and allowing them to air dry for 1 hr 15 minutes at room temperature, the panels are transferred to a humidity cabinet set at 60° C. and 85% humidity with an air flow not exceeding 15 m/ft across the panel. From Tuesday through Friday, the panels are once again immersed for 15 minutes in the saline solution and are allowed to all dry as previously explained. They are then transferred to the humidity cabinet and are held through the weekend. The cycle is then repeated for a total of 5 cycles. After completion, each panel is rinsed with water and scraped with a metal spatula. The average corrosion diameter is then obtained by randomly selecting points along the scab.

Figure 4:
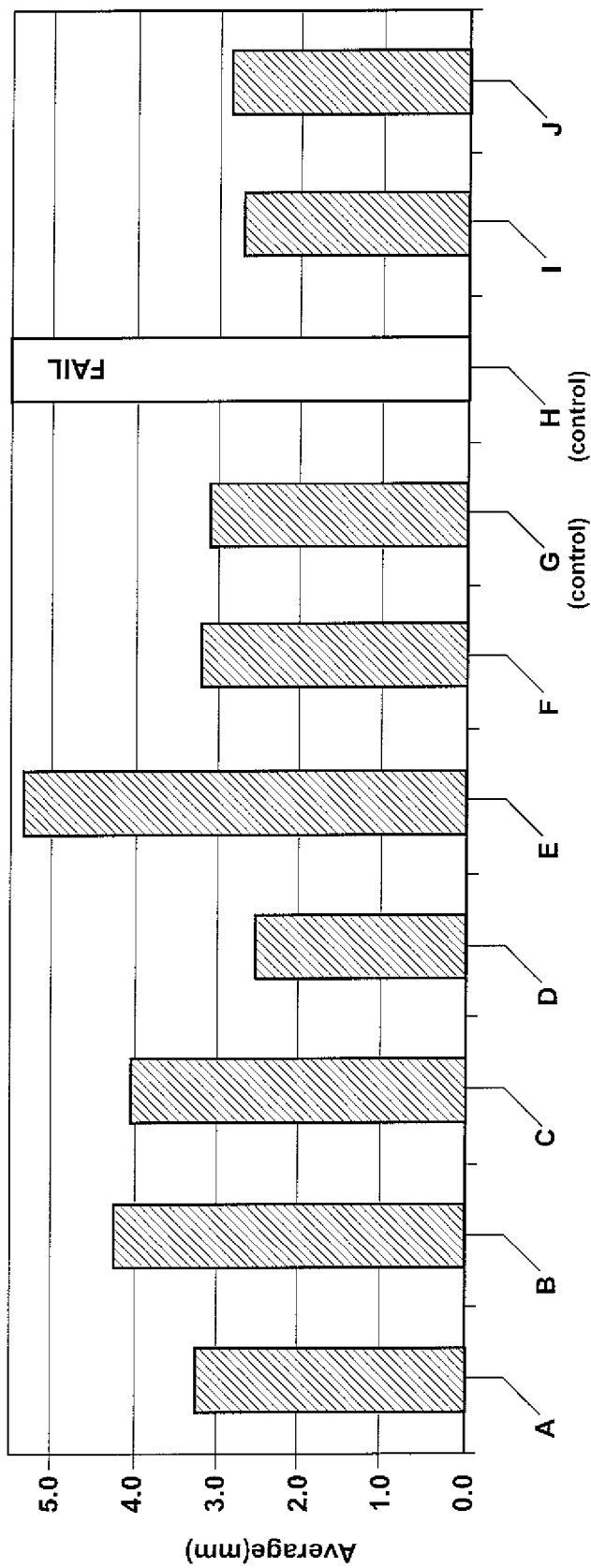
FIG. 4 is a bar graph summarizing an average corrosion diameter (mm) of Examples A-J in Corrosion Test G.

The results of Corrosion Test G are summarized in FIG. 4. Panels coated with zinc and low level of DDSA show promising corrosion inhibition. Adding higher levels of DDSA appears to be crucial as an average corrosion diameter of 5.15 mm is obtained without the presence of any DDSA. The best performing system (Example D) contains the high level of DDSA and 0.50% zinc and has a corrosion average of 2.51 mm.

Referring to Example J, adding the catalyst (the zinc) to the resin also shows similar level of corrosion inhibition. In addition, decreasing the DDSA amount by half also results in good corrosion inhibition in the presence of the same amount of zinc. As alluded to above, not adding any DDSA yields a panel exhibiting complete failure, even in the presence of zinc. Adding DDSA without any additional catalyst, however, leads to satisfactory corrosion inhibition, which may be attributed to activation of the DBTO, which is present in the pigment paste. Other metals per forming relatively well are Sn, Bi, Zr, and Y.

Corrosion Test L (Double Scab):

The CRS with zinc phosphate treatment panels are coated with the urethane coating compositions of Examples A-J to form urethane coatings of approximately 0.4 mil. These panels are cured at approximately 325° F. for approximately 15 minutes. These panels are strategically baked at 325° F., as opposed to 350° F., to better differentiate performance.

After coating, each panel is scribed with a scab having the appearance of an "X". Initial adhesion and shot blast is omitted in Corrosion Test L. The daily test sequence and test cycle are carried out by placing the panels in test on any weekday between Tuesday through Friday. A total of 36 test cycles are carried out, with each cycle equaling one day. The cycle is first started by subjecting each panel to a 60 minute bake with an oven temperature of 60° C., followed by gradual cooling to room temperature for 30 minutes. The salt immersion and humidity portion of the test follow by first placing each panel in an aqueous solution of 5% (wt) NaCl for 15 minutes followed by drying at ambient temperature for 75 minutes. This is performed once a week. After immersion, the panels are placed in a humidity cabinet (85% humidity) set at 60° C. for 22.5 hr (Note: On weekends, the panels are allowed to remain in the humidity cabinet). After the 36 day cycle, the panels are removed from testing, thoroughly rinsed and scraped with a metal spatula to remove any loose paint. The average corrosion diameter is then obtained by using a caliper and taking random measurements along each side of the scab.

Figure 5:
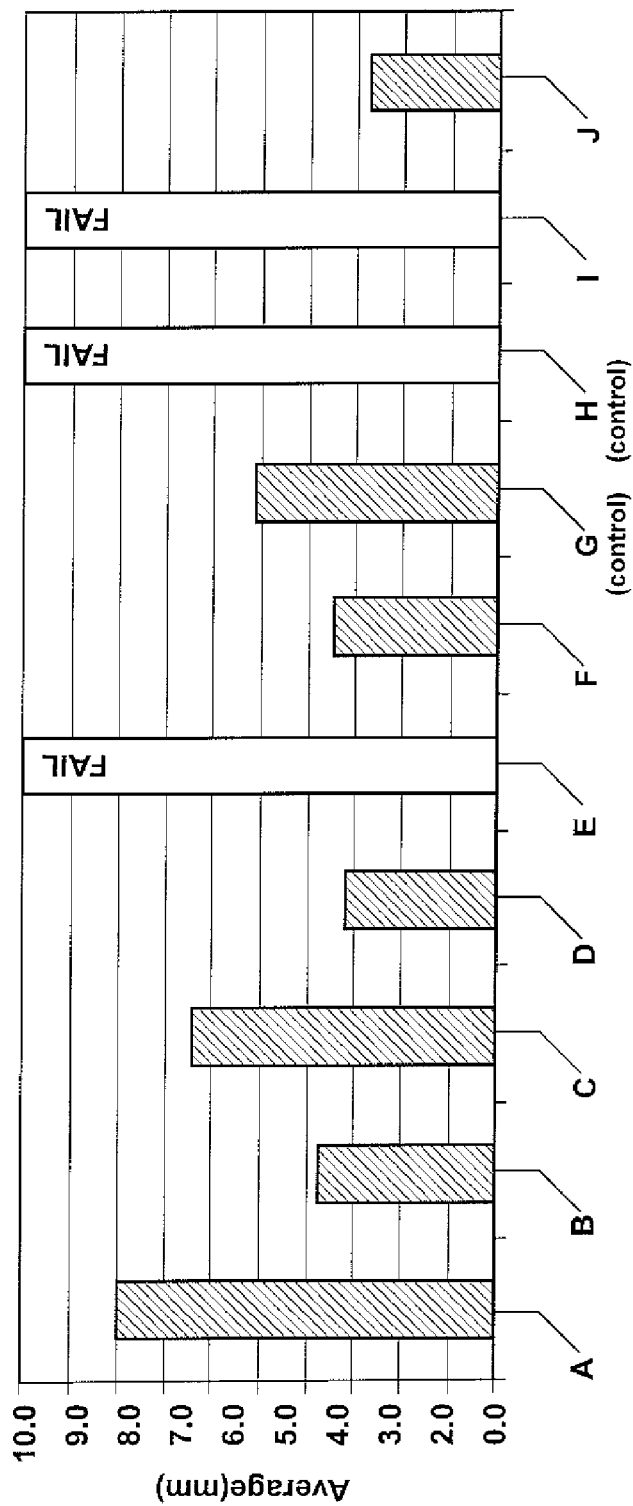
FIG. 5 is a bar graph summarizing an average corrosion diameter (mm) of Examples A-J in Corrosion Test L.

The results of Corrosion Test L are summarized in FIG. 5. The combination of zinc and high levels of DDSA exhibit the best corrosion inhibition with yttrium and bismuth also having an average corrosion diameter less than 4 mm. Consistent with the results of Corrosion Test G, direct addition of zinc oxide to the resin (Example J) provides adequate corrosion inhibition.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A method of catalyzing a reaction of a hydroxy-functional resin and a blocked isocyanate crosslinker to form a urethane coating, said method comprising the steps of:
    forming a polymeric ligand from the hydroxy-functional resin;
    incorporating a metal catalyst with the polymeric ligand to complex the metal catalyst with the polymeric ligand; and
    reacting the polymeric ligand and the crosslinker to form the urethane coating, wherein the polymeric ligand is formed prior to the reaction of the polymeric ligand and crosslinker to form the urethane coating;
    wherein the step of forming the polymeric ligand from the hydroxy-functional resin comprises carboxylating the resin by reacting an anhydride with the hydroxy-functional resin.

2. A method of catalyzing as set forth in claim 1 wherein the step of incorporating the metal catalyst with the polymeric ligand comprises incorporating the metal catalyst with the carboxylated resin to complex the metal catalyst with the carboxylated resin.

3. A method of catalyzing as set forth in claim 1 wherein the anhydride is selected from the group consisting of: maleic anhydride, hexahydrophthalic anhydride, methyl-hexahydrophthalic anhydride, tetrahydrophthalic anhydride, phthalic anhydride, succinic anhydride, dodecenylsuccinic anhydride, trimellitic anhydride, and mixtures thereof.

4. A method of catalyzing as set forth in claim 1 wherein the step of incorporating the metal catalyst with the polymeric ligand comprises incorporating a metal catalyst of the general formula MO or $M(OH)_n$ or $R^4_x MO$, where M is a metal selected from the group consisting of: Bi, Sn, Sb, Zn, Y, Al, Pb, Zr, Ce, Cu, and mixtures thereof; O represents an oxygen atom, OH represents a hydroxide ion, n is an integer satisfying the valency of M, $R^4$ is an organic group having from 4 to 15 carbon atoms, and x is an integer from 1 to 6.

5. A method of catalyzing as set forth in claim 1 wherein the step of incorporating the metal catalyst with the polymeric ligand is conducted simultaneous with the step of forming the polymeric ligand from the resin.

6. A method of catalyzing as set forth in claim 1 further comprising the step of incorporating a pigment-containing composition prior to the step of reacting the polymeric ligand and the crosslinker.

7. A method of catalyzing as set forth in claim 6 wherein the metal catalyst is incorporated into the pigment-containing composition to complex the metal catalyst with the polymeric ligand.

8. A method of catalyzing as set forth in claim 1 wherein the hydroxy-functional resin comprises an amine-modified epoxy resin.

9. A method of catalyzing as set forth in claim 1 further comprising the step of neutralizing the hydroxy-functional resin with an acid prior to the step of reacting the polymeric ligand and the crosslinker.

10. A method of catalyzing as set forth in claim 1 wherein the urethane coating is a cathodic electrocoat.

11. A method of catalyzing as set forth in claim 1 wherein the urethane coating is an anodic electrocoat.

12. A method of catalyzing as set forth in claim 1 wherein the polymeric ligand formed from the hydroxy-functional resin has a molecular weight, $M_n$, greater than approximately 1,000 Daltons.

13. A method of catalyzing as set forth in claim 1 wherein the hydroxy-functional resin is a cationic resin and the carboxylation of the cationic resin introduces some anionic character into the cationic resin.

14. A complex for catalyzing a urethane coating composition comprising a hydroxy-functional resin and a blocked isocyanate crosslinker, said complex comprising the reaction product of:
   a polymeric ligand formed from said hydroxy-functional resin; and
   a metal catalyst complexed with said polymeric ligand, wherein said polymeric ligand is formed prior to a reaction of said hydroxy-functional resin and the blocked isocyanate crosslinker to form a urethane coating
   wherein said polymeric ligand comprises the reaction product of said hydroxy-functional resin and an anhydride.

15. A complex as set forth in claim 14 wherein said hydroxy-functional resin comprises an amine-modified epoxy resin.

16. A complex as set forth in claim 14 wherein said anhydride is selected from the group consisting of: maleic anhydride, hexahydrophthalic anhydride, methyl-hexahydrophthalic anhydride, tetrahydrophthalic anhydride, phthalic anhydride, succinic anhydride, dodecenylsuccinic anhydride, trimellitic anhydride, and mixtures thereof.

17. A complex as set forth in claim 14 wherein said metal catalyst is of the general formula MO or $M(OH)_n$ or $R^4{}_xMO$, where
   M is a metal selected from the group consisting of: Bi, Sn, Sb, Zn, Y, Al, Pb, Zr, Ce, Cu, and mixtures thereof;
   O represents an oxygen atom,
   OH represents a hydroxide ion,
   n is an integer satisfying the valency of M,
   $R^4$ is an organic group having from 4 to 15 carbon atoms, and
   x is an integer from 1 to 6.

18. A complex as set forth in claim 14 wherein said urethane coating composition is a cathodic electrocoat composition.

19. A complex as set forth in claim 14 wherein said urethane coating composition is an anodic electrocoat composition.

20. A complex as set forth in claim 14 wherein said polymeric ligand formed from said hydroxy-functional resin and said anhydride has a molecular weight, $M_n$, greater than approximately 1,000 Daltons.

21. A complex as set forth in claim 14 wherein said hydroxy-functional resin is a cationic resin and wherein reaction of said cationic resin and said anhydride introduces some anionic character into said cationic resin.

* * * * *

UNITED STATES PATENT AND TRADEMARK OFFICE
CERTIFICATE OF CORRECTION

| | | |
|---|---|---|
| PATENT NO. | : 8,389,653 B2 | Page 1 of 1 |
| APPLICATION NO. | : 11/278030 | |
| DATED | : March 5, 2013 | |
| INVENTOR(S) | : December et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 817 days.

Signed and Sealed this
Thirtieth Day of December, 2014

Michelle K. Lee
*Deputy Director of the United States Patent and Trademark Office*